(12) United States Patent  (10) Patent No.: US 7,516,547 B2
McCann et al.  (45) Date of Patent: Apr. 14, 2009

(54) DOVETAIL SURFACE ENHANCEMENT FOR DURABILITY

(75) Inventors: Michael Edward McCann, Milford, OH (US); Sang Y Park, West Chester, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 11/314,147

(22) Filed: Dec. 21, 2005

(65) Prior Publication Data
US 2007/0140853 A1   Jun. 21, 2007

(51) Int. Cl.
*F01D 5/14* (2006.01)

(52) U.S. Cl. ............... 29/889.3; 29/889.7; 416/241 R; 416/248

(58) Field of Classification Search ............. 416/204 A, 416/241 R, 248; 428/674; 29/889.3, 889.7
See application file for complete search history.

(56) References Cited

U.S. PATENT DOCUMENTS

| | | | |
|---|---|---|---|
| 2,928,757 A | 3/1960 | Lee et al. | |
| 3,073,022 A | 1/1963 | Bush et al. | |
| 3,143,383 A | 8/1964 | Bamberger et al. | |
| 3,793,195 A | 2/1974 | Betts | |
| 3,914,178 A | 10/1975 | Fineran et al. | |
| 3,956,146 A | 5/1976 | Tsuya et al. | |
| 4,495,002 A | 1/1985 | Anello | |
| 5,160,243 A | 11/1992 | Herzner et al. | |
| 5,356,545 A * | 10/1994 | Wayte ........................ | 508/138 |
| 5,363,554 A | 11/1994 | Partridge et al. | |
| 5,476,363 A | 12/1995 | Freling et al. | |
| 5,601,933 A | 2/1997 | Hajmrle et al. | |
| 5,846,054 A * | 12/1998 | Mannava et al. ........ | 416/219 R |
| 6,267,558 B1 | 7/2001 | Dingwell et al. | |
| 6,536,109 B2 | 3/2003 | Berthelet et al. | |

FOREIGN PATENT DOCUMENTS

WO   9641068 A1   12/1996

* cited by examiner

*Primary Examiner*—Ninh H Nguyen
(74) *Attorney, Agent, or Firm*—McNees Wallace & Nurick, LLC

(57) ABSTRACT

A gas turbine engine blade having a dovetail with an enhanced surface for durability is disclosed. The blade includes an airfoil section and a dovetail section disposed opposite the airfoil section. The dovetail section has an outer surface, at least a portion of which has residual compressive stresses resulting from a plurality of peening operations. The dovetail section also includes a copper-nickel-indium wear coating layer disposed over the outer surface having residual compressive stresses and a lubricant coating layer disposed over the copper-nickel-indium wear coating layer, wherein the lubricant coating layer is lead-free.

6 Claims, 2 Drawing Sheets

DOVETAIL SURFACE ENHANCEMENT FOR DURABILITY

STATEMENT REGARDING FEDERALLY SPONSORED RESEARCH

This invention was made with government support under Contract F33657-99-D2050 awarded by the United States Air Force. The Government has certain rights in this invention.

FIELD OF THE INVENTION

The present invention relates generally to reduction in cracks and failures between gas turbine engine components and more particularly to reduction in dovetail cracks and failures of fan and compressor blades of gas turbine engines.

BACKGROUND OF THE INVENTION

In an aircraft gas turbine (jet) engine, air is drawn into the front of the engine by a fan, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades, which turns the shaft and provides power to the compressor. The compressor blades and fan blades are usually separate parts that are fretted onto one or more disks attached to a shaft, except in certain situations in which a blisk is used.

In certain aircraft engine designs, a titanium or titanium alloy disk, also referred to as a rotor, has an array of dovetail slots arranged around its outer periphery. Compressor and fan blades, also made of titanium or titanium alloy, have corresponding dovetail bases to allow mate-up of the blade dovetail bases with the respective rotor dovetail slots so that the blade is retained within the dovetail slots. When the rotor is operating at normal operating speeds, centrifugal force causes the blades to move radially outward.

Over time, cracks and failures have been known to develop in the dovetails, due to a variety of causes including aeromechanical response. High cycle fatigue exceeding material capability has been at least one factor in these failures.

Cracks may particularly arise in early stage fan blades, originating in the pressure face of the dovetail, at the contact between the blade and the disk. During engine operation the blade resonates due to engine forced responses and aeromechanical excitations. These vibrations cause sliding and an associated resisting shear force created by the normal force between the blade and disk along with the presence of friction. Areas of local stress concentration are created at the edge of the contact area to the friction that in turn causes a crack to initiate. The stress concentration creates fretting fatigue cracks that propagate to failure due to high cycle fatigue.

One proposed solution to the problem has been a single peening, followed by a Cu—Ni—In wear coating and then to apply a leaded dry film lubricant to the region between the blade dovetail and the rotor dovetail slot, such as that sold under the trade name of MOLYDAG® 254. MOLYDAG® is a federally registered trademark owned by Acheson Colloids Company of Port Huron, Mich. The lubricant lowers the coefficient of friction, thereby decreasing the stress concentration peak value. However, common dry film lubricants include lead, which have been limited or banned as environmentally unfriendly in many countries.

Another proposed solution includes a dual peening followed by an aluminum-bronze wear coating as described in U.S. Pat. No. 6,267,558, assigned to the assignee of the present invention, whose disclosure is incorporated here by reference in its entirety.

What is needed is a lead free surface enhancement for durability for gas turbine engine blade dovetails.

SUMMARY OF THE INVENTION

A gas turbine engine blade having a lead-free surface enhanced for durability is disclosed. The gas turbine engine blade comprises an airfoil section and a dovetail section disposed opposite the airfoil section. The dovetail section comprises an outer surface, at least a portion of which has residual compressive stresses resulting from a plurality of peening operations. The blade further comprises a wear coating layer comprising copper, nickel, and indium disposed over the at least the portion of the outer surface having residual compressive stresses and a lubricant coating layer disposed over the copper-nickel-indium coating layer, wherein the lubricant coating layer is lead-free.

A gas turbine engine rotor assembly is disclosed. The rotor assembly comprises a plurality of blades, each blade comprising a material selected from the group consisting of titanium and a titanium-base alloy, each blade further comprising an airfoil section and an opposed dovetail section comprising an outer surface, at least a portion of the outer surface having residual compressive stresses, the residual compressive stresses resulting from a plurality of peening operations, and a copper-nickel-indium coating layer disposed on the at least the portion of the outer surface. The rotor assembly also includes a rotor comprising a material selected from the group consisting of titanium and a titanium-base alloy, the rotor further comprising a plurality of dovetail slots positioned along an outer periphery, each dovetail portion being positioned in a slot, wherein each copper-nickel-indium coating layer functions as a barrier between each dovetail and each respective slot, each copper-nickel-indium coating layer providing a reduced coefficient of friction to the portion of the blade dovetail in contact with the rotor dovetail slot during normal engine operation.

A method for enhancing the surface durability of a gas turbine engine blade is also disclosed. The method comprises providing a gas turbine engine blade having an airfoil portion and a dovetail portion, the dovetail portion being opposed to the airfoil portion, peening the dovetail portion using first particles having a first preselected size, thereafter peening the dovetail portion using second particles having a second preselected size, wherein the second preselected size is smaller than the first preselected size, thereafter applying a copper-nickel-indium wear coating over a portion of an outer surface of the dovetail portion, and thereafter applying a lead-free dry film lubricant over the applied copper-nickel-indium wear coating.

One advantage of the invention is enhancement of turbine blade dovetail surfaces for extended durability in an environmentally friendly and acceptable manner.

Another advantage of the invention is a dovetail surface that has a durability superior to one that has a surface that is only single peened.

Still another advantage of the invention is combining a plurality of surface enhancements for a dovetail surface to decrease effects of high-cycle fatigue and improve engine life.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
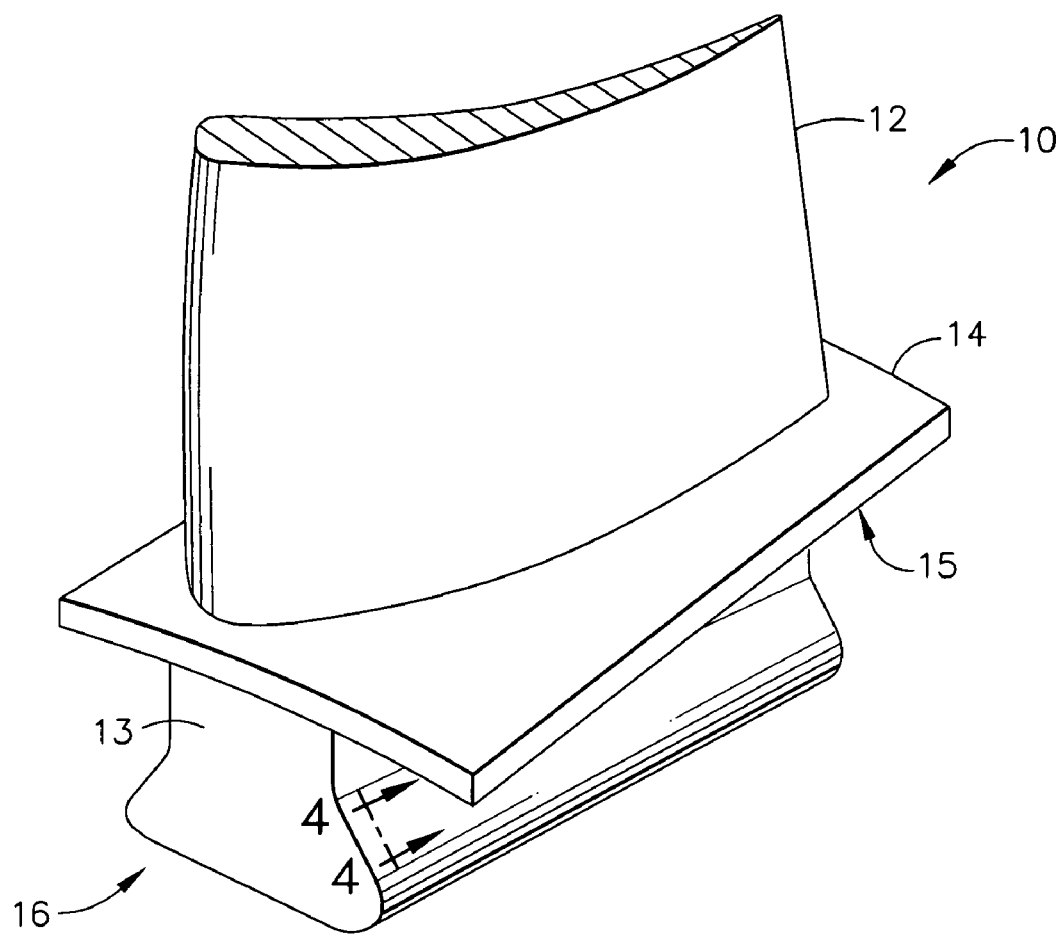
FIG. 1 is a partial perspective view and a partial section view of a typical gas turbine engine blade.

FIG. 1 is a perspective view of a typical gas turbine engine blade 10, such as a compressor blade or a fan blade. The blade depicted is a cantilevered blade having an axial dovetail. The blade 10 comprises an airfoil section 12 that extends outward into airflow, a downwardly extending shank section 13, and an attachment extending from the shank 13 in the form of a dovetail 16 that attaches the blade 10 to a rotor or disk (not shown). A platform 14 having a platform underside 15 extends transversely outwardly at a location between the airfoil 12 and the shank 13 and the dovetail 16. It will be appreciated that gas turbine engine blades may include various modifications to vary performance in specific applications, such as tip shrouds, cantilevered circumferential dovetails and part span shrouds. Nevertheless, most gas turbine engine blade designs include these fundamental features. The blade 10 may be constructed of any suitable material, although titanium and titanium-base alloys are typical.

Figure 2:
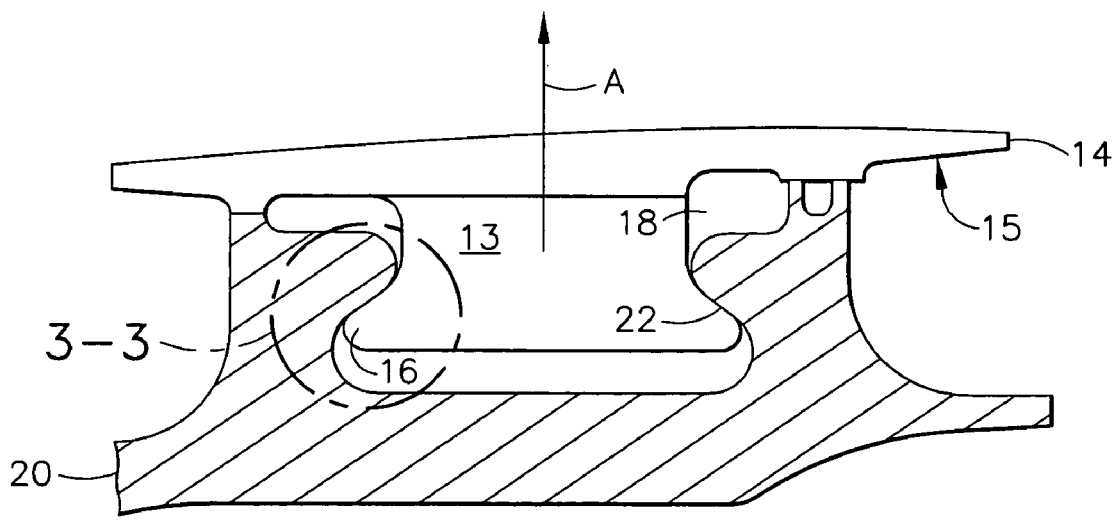
FIG. 2 is a cross-sectional view of a gas turbine engine blade installed within a dovetail slot of a typical rotor disk, during engine operation.

FIG. 2 depicts a blade dovetail 16 assembled into a dovetail slot 18 of a rotor 20, or disk, to form a rotor assembly. Each rotor 20 contains a plurality of dovetail slots 18 around its periphery to receive a plurality of blades 10. Furthermore, a typical aircraft gas turbine engine contains a plurality of compressor stages comprised of compressor blades assembled to rotors, each successive stage having an increasing number of smaller blades assembled to the rotor 20. Likewise, a typical aircraft gas turbine engine also contains a plurality of fan stages comprised of fan blades assembled to rotors. The rotor 20 may be constructed of any suitable material, but like the blade 10, the rotor 20 is also typically constructed of titanium or titanium-base alloys. Exemplary titanium alloys include Ti-6-4, Ti-17 and Ti-8-1-1. The blade 10 and the rotor 20 may, but need not necessarily, have the same composition.

As the engine rotates at high speeds, the blade dovetail 16 moves outwardly as a result of centrifugal force in the direction A as shown in FIG. 2. The motion causes resulting contact between the blade dovetail 16 and the dovetail slot 18 along a region of contact 22. In addition to the outward forces due to the continued effect of centrifugal force, there is also continued rubbing as a result of engine vibration and airflow dynamics as the rotor 20 turns.

Cracks typically initiate in the dovetail along the region of contact 22 and then propagate into the blade. This cracking entails costly downtime and periodic inspections in order to detect and remove cracked blades before a failure occurs.

Figure 3:
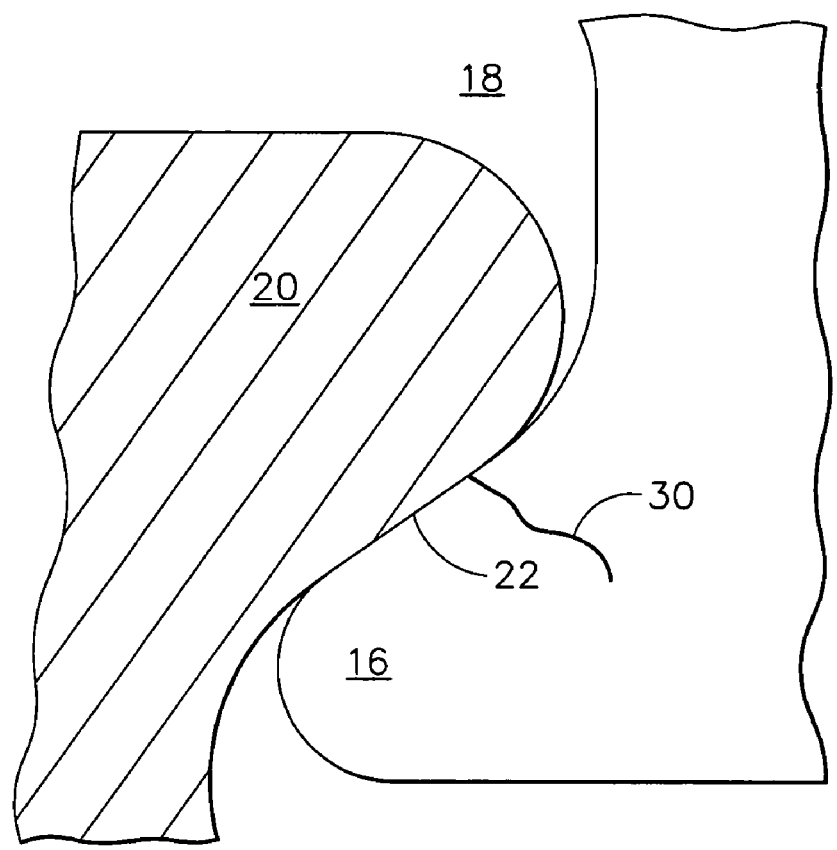
FIG. 3 is an exploded view of area 3-3, which is the contact region between the blade dovetail and the rotor dovetail slot.

The present invention helps to increase the life expectancy of the blade dovetails by modifying the processes involved in both the initiation of cracking and in the propagation of the initiated cracks. As illustrated in FIG. 3, the region of contact 22 exhibits high stresses as a result of rubbing between the wall of the dovetail slot 18 on the rotor 20 and the wall of the blade dovetail 16 that may result in the development of a crack 30.

The present invention delays the onset of crack initiation by applying a copper-nickel-indium (Cu—Ni—In) coating to the blade dovetail following a mechanical treatment of dual intensity peening. A lead-free dry film lubricant is then applied to the blade dovetail over the Cu—Ni—In coating.

Figure 4:
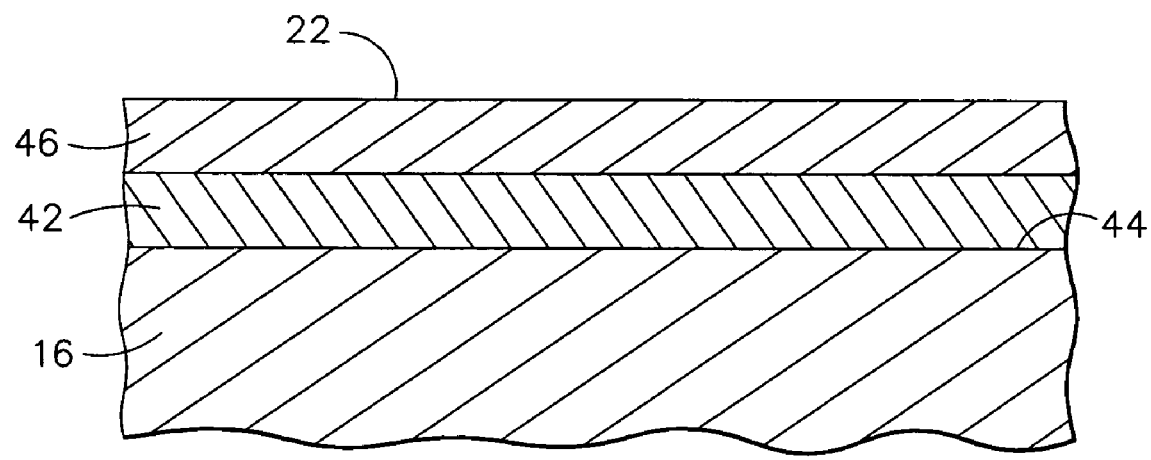
FIG. 4 is a cross-sectional view of a gas turbine engine blade dovetail having the surface enhancement according to an exemplary embodiment of the invention.

As shown in FIG. 4, the dovetail 16 has a mechanically enhanced dovetail surface 44 to which a compressive stress has been applied by dual intensity peening. A Cu—Ni—In wear coating 42 is applied over the dovetail 16, preferably in contact with the dovetail surface 44. A lead-free dry film lubricant is applied as a lubricant layer 46 overlying, and preferably in contact with, the wear coating 42. The dry film lubricant is sacrificial and serves as an outer layer of protection for the dovetail 16. Once the dry film lubricant has been dissipated, the Cu—Ni—In, applied as the wear coating 42 on the blade dovetail, next serves to reduce friction between the structural portion of the blade dovetail 16, comprised of titanium or titanium alloys, and the titanium-based rotor 20. Like the dry film lubricant, the Cu—Ni—In wear coating 42 is also sacrificial.

As used herein, the term "Cu—Ni—In" refers to copper-base alloys having a nickel content in the range of about 35% to about 38% by weight, an indium content in the range of about 4.5% to about 5.5% by weight, and up to about 1% by weight combined iron and impurities, balance copper. Preferably, the composition is about 35.5% to about 37.5% by weight nickel, about 4.7% to about 5.2% by weight indium, up to about 1% by weight combined iron and impurities, balance copper. The Cu—Ni—In wear coating 42 is applied to the blade dovetail 16 to a thickness in the range about 0.0035 inches to about 0.007 inches. Where the blade 10 is a fan blade, the Cu—Ni—In is preferably applied to a thickness in the range of about 0.0035 inches to about 0.005 inches. Where the blade 10 is a high pressure compressor blade, the thickness is preferably in the range of about 0.004 to about 0.007 inches. Although the Cu—Ni—In material may be applied as a coating by any suitable method, thermal spraying is preferred.

Following the application of the Cu—Ni—In coating, a lead-free dry film lubricant is applied to the blade 10. The dry film lubricant may be any suitable lead-free lubricant, although preferred lead-free dry film lubricants also have few or no volatile organic compounds that, like lead, are environmentally undesirable. One particularly suitable lead-free dry film lubricant for use in the present invention is available under the tradename EVERLUBE® 9002, available from the Curtis-Wright Corporation of Roseland, N.J., having a nominal composition of about 10% to about 20% by weight molybdenum disulfide, about 10% to about 15% by weight inorganic antimony compound, about 1% to about 5% by weight n-butanol, about 1% to about 5% by weight isobutanol, about 1% to about 5% by weight n-methyl pyrrolidone, about 1% to about 5% by weight n-propoxypropanol, less than about 1% by weight dimethyl ethanolamine, and balance water. EVERLUBE® is a federally registered trademark owned by the Curtis-Wright Corporation.

The lubricant is typically sprayed or brushed on over the wear-coating in layers. While the lubricant may initially contain water and thus may be "wet" when sprayed or brushed, the application process further includes curing at elevated temperatures to drive off water, resulting in the application of a lead-free dry film lubricant.

The lead-free dry film lubricant is preferably applied to a thickness in the range of about 0.001 inches to about 0.003 inches. Where the blade is compressor blade, the lubricant is preferably applied to a thickness of about 0.001 to about 0.002 inches. Where the blade is a fan blade, the lubricant is preferably applied to a thickness of about 0.0015 inches to about 0.003 inches.

While the Cu—Ni—In and lead-free dry film lubricant provide the benefit of reduced friction, since they are sacrificial, their benefits eventually disappear after they wear away. Thus, to provide additional protection in this region, the dovetail portion of the blade is mechanically modified so that it can endure the stresses in this region after the lead-free dry film lubricant and Cu—Ni—In wear coating have been sacrificed.

This is accomplished by dual peening the surface of the blade in the dovetail. Dual peening results in a residual compressive stress layer in the surface region of the blade. Thus, when the blade dovetail contacts the rotor wall in the region of contact 22, although the applied load is the same, the region of contact has a lower resultant stress due to the presence of the residual compressive stress layer. The residual compressive stress in the surface region of the dovetail after the peening operation is an opposite or opposed stress to the tensile stress caused during engine operation. The cumulative effect of the residual compressive stresses and the applied stresses due to engine operation is a lower resultant stress, which acts to at least delay the onset of crack initiation.

The desired compressive stress in the surface should extend to the maximum extent possible into the surface in order to maximize the wear/fretting depth protection, and the operation that produces such a stress should not itself inflict damage to the surface. The residual compressive stresses preferably extend to a depth of at least about 0.008-0.010 inches. A method referred to as dual intensity peening has been found to produce such a desirable compressive stress. The article, in this case the dovetail of the blade, and preferably the entire dovetail section, including the shank and the platform underside, is first subjected to a peening operation with first particles of a first size. This produces a compressive stress to a first desired depth. Then, the article is peened a second time with second particles having a second size smaller that the first particles. The second particles act to smooth out the surface of the article, which may have been somewhat roughened by the first peening operation and prevent the development of minute surface damage. The second peening operation also produces additional compressive stresses, but these compressive stresses do not extend as deeply as those produced by the first operation. Thus, the article peened by the dual intensity peening operation has a complex residual stress pattern that reaches a peak at or near the surface.

The preferred method for applying a compressive stress in accordance with exemplary embodiments of the invention is a first peening of the blade dovetail 16, shank 13, and platform underside 15 at a high intensity, followed by a second peening at a lower intensity. Typically, the first peening is conditioned cut wire pending performed at an intensity in the range of about 0.013 A to about 0.017 A, using the Almen "A" scale, and preferably is performed at an intensity of about 0.015 A. The second, lower intensity, peening is typically performed at an intensity in the range of about 0.005 A to about 0.007 A, preferably at about 0.007 A. Furthermore, the stresses from the multiple peening operations are not uniform, as the highest compressive stresses occur at or very near the surface of the blade dovetail, shank and platform underside.

While friction between the blade dovetail and the walls of the dovetail slot in the rotor will increase after loss of the sacrificial coating, the overall stresses will be reduced due to the presence of the compressive layer, thereby extending the life of the blade by further delaying the inception of cracking, as well as slowing the crack propagation process. Any peening media, including shot peening media, may be used, although conditioned cut wire peening is preferred.

While the constant rubbing between the blade dovetail and the walls of the rotor at the dovetail slot will eventually result in the loss of the lead-free lubricant, sacrificial coating and in the wearing away of the compressive region located along the surface of the blade dovetail, the reduced friction of a lead-free dry film lubricant and a copper-nickel-indium wear coating and the reduction in resultant stress due to the dual peening operation will delay the onset of fatigue induced cracking in the blade dovetails. If such a delay extends the life of the dovetails beyond the expected life of the engine, the fatigue cracking will have effectively been eliminated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for processing a gas turbine engine blade comprising the steps of:
   providing a gas turbine engine blade having an airfoil portion and a dovetail portion, the dovetail portion being opposed to the airfoil portion;
   peening the dovetail portion using first particles having a first preselected size; thereafter
   peening the dovetail portion using second particles having a second preselected size, wherein the second preselected size is smaller than the first preselected size; thereafter
   applying a copper-nickel-indium wear coating over a portion of an outer surface of the dovetail portion; and thereafter
   applying a lead-free dry film lubricant over the applied copper-nickel-indium wear coating including applying an aqueous lead-free lubricant coating layer over the applied copper-nickel-indium wear coating and curing the aqueous lead-free lubricant coating layer to remove water.

2. The method of claim 1 wherein the step of providing a gas turbine engine blade comprises providing a compressor blade.

3. The method of claim 2 wherein the step of applying a copper-nickel-indium wear coating comprises applying the coating to a preselected thickness in the range of about 0.004 inch to about 0.007 inch.

4. The method of claim 1 wherein the step of providing a gas turbine engine blade comprises providing a fan blade.

5. The method of claim 4 wherein the step of applying a copper-nickel-indium wear coating comprises applying the coating to a preselected thickness in the range of about 0.0035 inch to about 0.005 inch.

6. The method of claim 1 wherein the applying a lead-free dry film lubricant comprises applying the lubricant to a preselected thickness in the range of about 0.001 inch to about 0.003 inch.

* * * * *